United States Patent [19]
Weidner et al.

[11] Patent Number: 5,814,396
[45] Date of Patent: Sep. 29, 1998

[54] GREASE ABSORBING PAD

[76] Inventors: Ron J. Weidner, 7016 Johnsonburg Rd., Spring Grove, Ill. 60081; John C. Miller, 32 Deer Point Dr., Hawthorn Woods, Ill. 60047

[21] Appl. No.: 691,485

[22] Filed: Aug. 2, 1996

[51] Int. Cl.$^6$ ..................................................... B32B 23/08
[52] U.S. Cl. ..................... 428/213; 428/311.11; 428/511; 428/537.5; 219/725; 219/733
[58] Field of Search .......................... 428/311.11, 311.91, 428/537.5, 213, 511; 219/725, 733

[56] References Cited

U.S. PATENT DOCUMENTS

| | | |
|---|---|---|
| 4,930,906 | 6/1990 | Hemphill . |
| 4,950,524 | 8/1990 | Hacker . |
| 5,093,176 | 3/1992 | Pribonic et al. . |

*Primary Examiner*—Marion E. McCamish
*Assistant Examiner*—Elizabeth M. Cole
*Attorney, Agent, or Firm*—John G. Premo

[57] ABSTRACT

A disposable three layered pad for collecting cooking grease. The top layer is made up of at least one ply of a grease absorptive sheet. The middle layer is a grease resistant sheet. Finally, the bottom layer is an anti-stick insulating sheet. The pad is dimensioned to cover a substantial portion of the bottom cooking area of a microwave oven.

3 Claims, 1 Drawing Sheet

GREASE ABSORBING PAD

FIELD OF THE INVENTION

This invention relates to disposable pads for absorbing cooking grease.

BACKGROUND OF THE INVENTION

It is now known to be beneficial to health to remove grease in liquefied fat, produced by the cooking of meat, poultry and fish. As pointed out in the book, *Program for Reversing Heart Disease*, Dean Ornish, M.D,Random House, 1990, a major cause of coronary blockage is a diet rich in animal fats. In this work, it is also mentioned that fatty diets tend to be a primary cause of obesity.

Grease removal during the actual cooking process has been done in the past by the use of tray type collectors. These allow the fat containing food to sit directly in a container. This allows the food to cook in its own juices thereby re-absorbing a portion of the removed fat. In other instances, racks are used to suspend the fat containing food above a container. The grease is collected without the food re-absorbing fat removed during the cooking process.

While these devices have been used to remove grease from fatty foods in conventional convection ovens they are not too practical when used with microwave ovens. In the first instance, metal containers cannot be used in microwave ovens since they short out the microwave generator. Secondly, while temperature resistant plastic trays are sometimes used in microwave oven cooking they are not satisfactory since they often take up cooking space which in most microwave ovens is at a premium. Finally ,in removing such devices from microwave ovens after the cooking process is finished grease sometimes is spilled in the oven thus necessitating a messy clean-up.

Even if grease removal is practiced during the cooking process additional grease can be removed from cooked fat containing foods prepared by a variety of cooking methods using absorbents such as paper towels. In this process the freshly prepared fatty food is placed on the absorbent to drain the grease which is primarily on the surface of the food item. In some cases an absorbent is placed both above and below the food item. The bottom absorbent receives the draining grease and the upper absorbent removes some grease by capillary action. One drawback to such drainage methods is that when the bottom layer becomes grease saturated the excess grease is deposited on the surface upon which the absorbent rests. This requires a subsequent clean-up of such surfaces.

OBJECTS OF THE INVENTION

If it were possible to provide a simple grease removal and storage device for microwave ovens when they are used to prepare fat containing foods an advance to the art would be afforded. Of further benefit, would be such a device which after it had collected substantial quantities of grease generated from a microwave oven it would be capable of removal without danger of spilling fat in the microwave. Such a device would be even of greater convenience if it were disposable, inexpensive and also could be used to drain grease from freshly cooked fatty foods prepared by any of several well known cooking methods. These goals, therefore, are considered to be the objects of the present invention.

SUMMARY OF THE INVENTION

The invention comprises a disposable three layered absorbtive pad for collecting and draining cooking grease. It is most effective in collecting grease produced during microwave oven cooking. The pad also may be used to drain grease from recently prepared fatty foods prepared using any cooking technique.

The top layer is made up of at least one ply of a grease absorptive sheet. The middle layer is a grease resistant sheet. Finally, the bottom layer is an anti-stick insulating sheet. The pad is dimensioned to cover a substantial portion of the bottom cooking area of a microwave oven. It may be of any convenient size when it is used to drain freshly cooked fatty foods.

The top layer of the disposable three layered pad is most often thicker than the middle and bottom layers. Also the top layer beneficially contains a plurality of plies which are readily assembled from cellulose fibers such as an absorptive paper. The middle layer desirably is formed from a high temperature stable, grease resistant plastic sheet such as high density polyethylene. The expression "high temperature" means the temperatures at which fatty foods are usually cooked. The bottom layer is a heat insulating sheet. Cellulose fibers of the type used to form the top layer may be used to form the bottom layer.

THE DRAWINGS

For a more detailed description of the invention reference may be had to the drawings of which:

In the drawings like parts have like numbers.

DETAILED DESCRIPTION OF THE INVENTION

Figure 1:
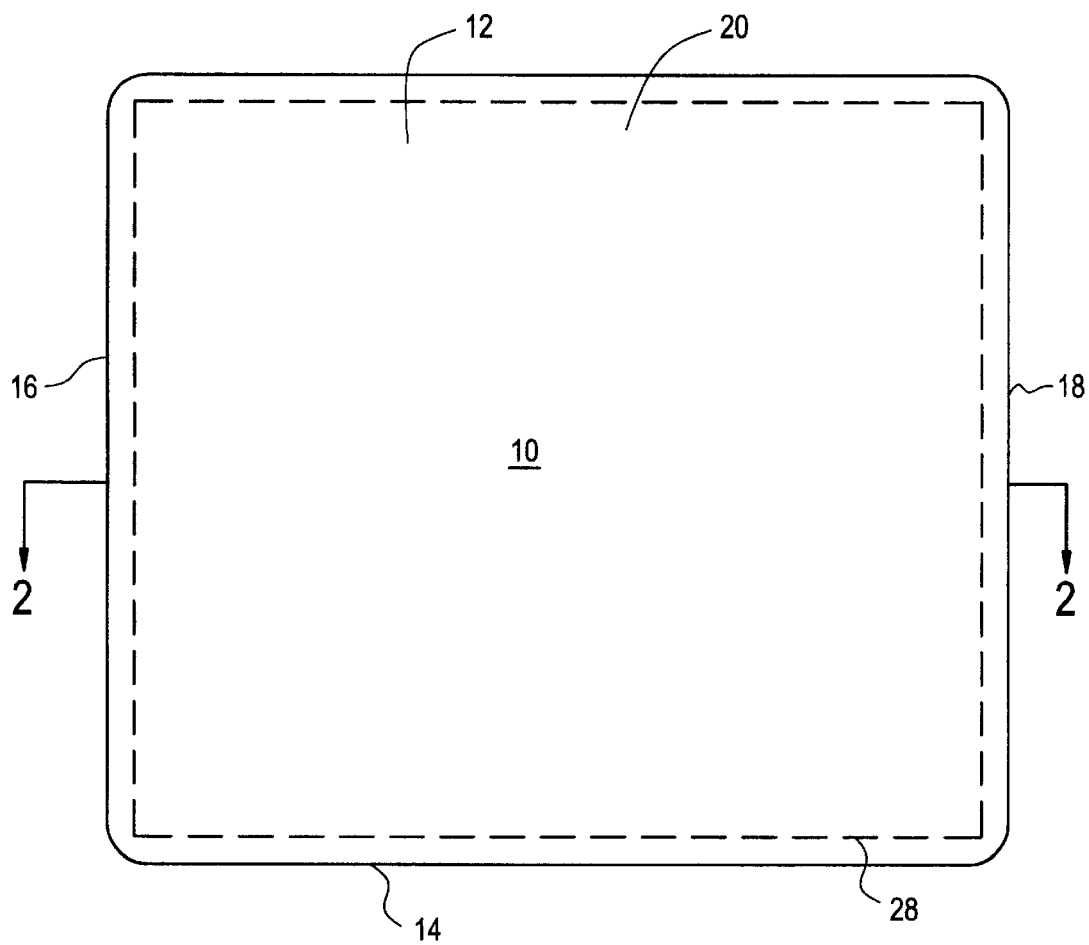
FIG. 1 is a front view of a disposable pad of the invention.

With specific reference to the drawings there is shown in FIG. 1 a disposable pad designated generally by the numeral 10. This particular embodiment is shown as a square substantially flat pad having a top 12 and a bottom 14. The sides of the square are designated by the numerals 16 for the left and 18 for the right.

Figure 2:
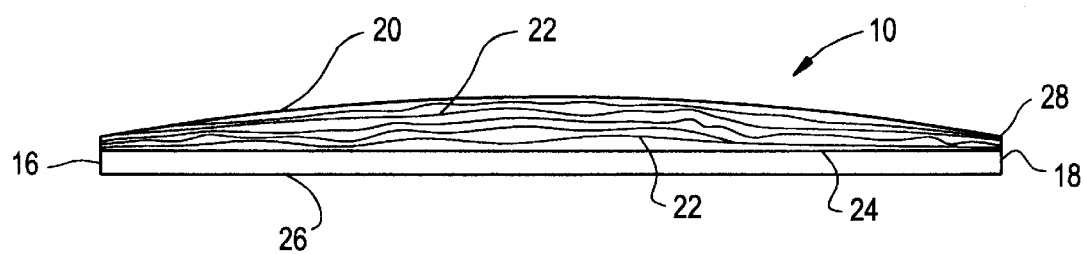
FIG. 2 is a horizontal side view taken along lines 2—2 of FIG. 1.

As illustrated in Fig. 2 the disposable pad is made up of a top layer 20 which is shown in FIG. 2 as being composed of several plies 22 of a grease absorptive material. The middle layer 24 is a thin, grease resistant sheet which is superimposed upon bottom layer 26 which acts to insulate middle layer from excessive heat which might cause it to stick to the bottom of a microwave oven. The three layers may be assembled into a unitary disposable grease retaining pad by means of stitching 28. Adhesives may be substituted for the stitching.

In a typical embodiment of the invention, the top 12 and bottom 14 of disposable pad 10 would be 9 inches in width and sides 16 and 18 would be 11 inches in length. The dimensions of the disposable pad 10 will vary depending on the size of the bottom of the particular microwave oven in which they are used. In some cases these ovens have a circular rotating "lazy susan" type assembly located on the floor of the ovens and in such cases the disposable pad 10 would be circular in shape.

Top layer 20 may be a single ply of a grease absorbing material. It may be a porous paper assembly likened to a tea bag filled with a grease absorbent such as clays e.g. vermiculite or activated carbon. Preferably the top layer is made from absorptive paper products such as paper towel stock. Middle layer 24 is preferably a thin plastic sheet of about from 0.5 to several mills in thickness. It should be able to withstand the temperatures generated from microwave oven cooking without loosing its integrity. Hydrocarbon plastic sheeting such as high density polymers of ethylene, propylene and butylene are preferred materials. Plastic sheeting containing chlorine, nitrogen or fluorine in their molecular make-up are not materials of choice due to the possibility of generating toxic compounds. Bottom layer 26 should be about the same thickness as middle layer 24 and should be constructed of a heat insulating material which shields the middle layer 24 from the hot bottom surface of microwave ovens which hot surfaces may cause the plastic sheet, middle layer 24, to stick and a possibly tear after the cooking process is finished.

As indicated top layer 20 is preferably thicker than individual layers 24 and 26. The ratio of this thickness differential is that is at least 2 to 5 times greater. Preferably the differential is 10 to 50 times greater.

Assembly of the Disposable Pads

An assembly corresponding generally to FIGS. 1 and 2 was made with the top layer 20 being ten sheets of commercial paper toweling stock. The layers were cut to the dimensions 9" by 11" and laid on top of each other. These sheets were then laid on top of the middle layer 24 which was a 2 mills thick sheet of high density polyethylene. This plastic film was slightly larger than top layer 20 and the corners were wrapped around the edge. the two layers were sewn together. The plastic side of the sewn unit was placed on top of a single sheet of paper towel stock of the type used to fabricate the top layer. It was attached to the other two layers by stitching.

Using the Disposable Pads

Meat and other foodstuffs would be placed on to the top layer 20 of the disposable pad 10. optionally, an additional disposable pad 10 can be placed on top of the food to be cooked in the microwave oven. As food is cooked in the microwave oven grease and other fatty materials are absorbed into top layer 20. Grease thus absorbed in the top layer and will not leak onto the bottom of the microwave oven since it is contained by means of the grease resistant middle layer 24. Bottom layer 26 insulates middle layer 24 from the sticking to the bottom of the microwave oven. After cooking the disposable pad 10 is removed from the microwave oven and the food lifted from the pad which is discarded.

In the case of fatty foods cooked in conventional ovens as well as microwave ovens the pads of the invention may be used to drain grease from these food when they are first removed from the oven, grill, fry pan or the like. When used to drain grease the pad is placed top face up on a counter or similar surface, the food allowed to rest thereon and the grease being permitted to drain for several minutes. Additional grease may be removed by placing a second pad top face down on the freshly prepared fatty food. This allows grease in contained in the top surface to be absorbed by the pads. This latter method is useful in removing grease from such food items as bacon, sausage patties, hamburgers and the like. With the middle layer 24 of the disposable pad 20 being present it is impossible for absorbed grease to migrate to a counter top thus preventing the need for clean-ups after the food placed on the pad has finished draining.

Benefits of the Disposable Pads

The invention provides a disposable system for microwave cooking of food. After cooking, the food and disposable pad are removed from the oven, leaving the microwave oven totally clean. No dishes are generated. After the cooked food is removed, the unwanted grease contained in the pad is simply thrown into the garbage.

Cooking foodstuff with this device removes large quantities of grease and other fatty materials. With concerns for a healthier diet this disposable pad provides a safe, economical and efficient way to decrease the level of these undesirable components from our diets. As a result this pad may be very beneficial for a longer, healthier life.

The pads of the invention are suited for use in draining grease from freshly prepared foods which are cooked by any means, e. g. microwave ovens, convection ovens, grills, frying pans and the like. They absorb large quantities of grease yet at the same time do not soil surfaces on which they are used during the grease drainage process.

EXAMPLE 1

Bacon was cooked in a microwave on a microwaveable plate for 4 minutes. After cooking, the bacon was removed from the plate and placed on the disposable pad. The following results were obtained:

| | | |
|---|---|---|
| a) | weight of raw bacon | 80.7 g |
| b) | weight of volatile components lost during cooking (moisture) | 30.0 g |
| c) | weight of grease on the cooking plate | 26.3 g |
| d) | weight of cooked bacon before pad | 24.4 g |
| e) | weight of grease absorbed by the pad | 6.4 g |
| f) | weight of cooked bacon after pad | 18.0 g |

EXAMPLE 2

Bacon was cooked in a microwave on the pad for 4 minutes. After cooking, the bacon was removed from the disposable pad. The following results were obtained:

| | | |
|---|---|---|
| a) | weight of raw bacon | 95.7 g |
| b) | weight of volatile components lost during cooking (moisture) | 32.8 g |
| c) | weight of grease absorbed by the pad | 46.5 g |
| d) | weight of cooked bacon after pad | 16.4 g |

EXAMPLE 3

Bacon was cooked in a microwave on the pad for 5 minutes. After cooking, the bacon was removed from the disposable pad. The following results were obtained:

| | | |
|---|---|---|
| a) | weight of raw bacon | 151.6 g |
| b) | weight of volatile components lost during cooking (moisture) | 46.3 g |
| c) | weight of grease absorbed by the pad | 66.8 g |
| d) | weight of cooked bacon after pad | 38.5 g |

EXAMPLE 4

Bacon was cooked on top of a conventional stove in a frying pan for 15 minutes. After cooking, the bacon was removed from the frying pan and placed on the disposable pad. The following results were obtained:

| a) | weight of raw bacon | 450.4 g |
|---|---|---|
| b) | weight of volatile components lost during cooking (moisture) | 149.1 q |
| c) | weight of grease on the cooking plate | 160.2 g |
| d) | weight of cooked bacon before pad | 141.1 g |
| e) | weight of grease absorbed by the pad | 45.6 g |
| f) | weight of cooked bacon after pad | 95.5 g |

EXAMPLE 5

Sausage patties were cooked in a microwave on a microwaveable plate for 4.5 minutes. After cooking, the sausage patties were removed from the plate and placed on the disposable pad. The following results were obtained:

| a) | weight of raw sausage patties | 144.1 g |
|---|---|---|
| b) | weight of volatile components lost during cooking (moisture) | 44.0 g |
| c) | weight of grease on the cooking plate | 10.8 g |
| d) | weight of cooked sausage patties before pad | 89.3 g |
| e) | weight of grease absorbed by the pad | 11.8 g |
| f) | weight of cooked sausage patties after pad | 77.5 g |

EXAMPLE 6

Sausage patties were cooked in a microwave on the pad for 3 minutes. After cooking, the sausage patties were removed from the disposable pad. The following results were obtained:

| a) | weight of raw sausage patties | 194.6 g |
|---|---|---|
| b) | weight of volatile components lost during cooking (moisture) | 23.3 g |
| c) | weight of grease absorbed by the pad | 42.0 g |
| d) | weight of cooked sausage patties after pad | 129.3 g |

EXAMPLE 7

Pre-cooked brats were cooked in a microwave on the disposable pad for 4 minutes. After cooking, the brats were removed from the pad. The following results were obtained:

| a) | weight of the brats | 229.8 g |
|---|---|---|
| b) | weight of volatile components lost during cooking (moisture) | 33.8 g |
| c) | weight of grease absorbed by the pad | 17.1 g |
| d) | weight of cooked brats after pad | 178.9 g |

EXAMPLE 8

Sausage patties were cooked on top of a conventional stove in a frying pan for 15 minutes. After cooking, the sausage patties were removed from the frying pan and placed on the disposable pad. The following results were obtained:

| a) | weight of raw sausage patties | 541.7 g |
|---|---|---|
| b) | weight of volatile components lost during cooking (moisture) | 75.3 g |
| c) | weight of grease on the cooking plate | 108.9 g |
| d) | weight of cooked sausage patties before pad | 357.5 g |
| e) | weight of grease absorbed by the pad | 25.5 g |
| f) | weight of cooked sausage patties after pad | 332.0 g |

EXAMPLE 9

Frozen brats were cooked in a microwave on the pad for 6 minutes. After cooking, the brats were removed from the pad. The following results were obtained:

| a) | weight of the brats | 208.4 g |
|---|---|---|
| b) | weight of volatile components lost during cooking (moisture) | 38.8 g |
| c) | weight of grease absorbed by the pad | 40.3 g |
| d) | weight of cooked brats after pad | 129.3 g |

We claim:

1. A disposable three layered pad for collecting cooking grease produced during the cooking of fattty foods in the bottom cooking area of a microwave oven comprising:

a) a top grease absorbing layer having at least one ply of a grease absorptive sheet;

b) a middle grease and high temperature resistant plastic layer; and, c) a bottom layer composed of an anti-stick, heat insulating sheet: with the pad being dimensioned to cover a substantial portion of the bottom cooking area of a microwave oven and, with the top layer being from 2 to 50 times thicker than the middle and bottom layers.

2. The disposable three layered pad of claim 1 where the top layer contains a plurality of plies, the grease absorptive sheet is composed of cellulose fibers, the middle layer is a high temperature stable, grease resistant plastic sheet and the bottom layer is composed of cellulose fibers.

3. The disposable three layered pad of claim 1 where the top and bottom layers are composed of absorptive paper and the middle layer is high density polyethylene.

* * * * *